(12) United States Patent
Zard et al.

(10) Patent No.: US 7,473,740 B2
(45) Date of Patent: Jan. 6, 2009

(54) METHOD FOR PARTIAL OR TOTAL OXIDATION OF ONE OR SEVERAL THIOCARBONYLTHIO ENDS OF A POLYMER OBTAINED BY RADICAL POLYMERISATION CONTROLLED BY REVERSIBLE ADDITION-FRAGMENTATION

(75) Inventors: Samir Zard, Gig sur Yvette (FR); Béatrice Sire, Palaiseau (FR); Philippe Jost, Lyons (FR)

(73) Assignee: Rhodia Chimie, Cedex (FR)

( * ) Notice: Subject to any disclaimer, the term of this patent is extended or adjusted under 35 U.S.C. 154(b) by 290 days.

(21) Appl. No.: 10/576,531

(22) PCT Filed: Oct. 21, 2004

(86) PCT No.: PCT/FR2004/002690

§ 371 (c)(1),
(2), (4) Date: Apr. 19, 2006

(87) PCT Pub. No.: WO2005/040233

PCT Pub. Date: May 6, 2005

(65) Prior Publication Data

US 2007/0027266 A1 Feb. 1, 2007

(30) Foreign Application Priority Data

Oct. 22, 2003 (FR) .................................. 03 12338

(51) Int. Cl.
*C08C 19/04* (2006.01)
*C08C 19/30* (2006.01)
(52) U.S. Cl. .............. 525/329.4; 525/330.3; 525/331.9; 525/333.8; 525/388
(58) Field of Classification Search ............. 525/330.3, 525/331.9, 329.4, 388, 333.8
See application file for complete search history.

(56) References Cited

U.S. PATENT DOCUMENTS 5,618,898 A * 4/1997 Nagasawa et al. ........... 526/245

FOREIGN PATENT DOCUMENTS

WO    WO 02/090397 A1 * 11/2002
WO    WO 03/070780 A1 * 8/2003

* cited by examiner

*Primary Examiner*—Roberto Rábago
(74) *Attorney, Agent, or Firm*—Hunton & Williams LLP

(57) ABSTRACT

The present invention relates to a method for partial or total oxidation of one or several thiocarbonylthio ends of a polymer, obtained by radical polymerisation controlled by reversible addition-cleavage with thiocarbonylthio agents, Said method comprising the step of contacting said polymer with an ozone-containing gas, during which ozone reacts with the one or several thiocarbonylthio ends.

22 Claims, No Drawings

METHOD FOR PARTIAL OR TOTAL OXIDATION OF ONE OR SEVERAL THIOCARBONYLTHIO ENDS OF A POLYMER OBTAINED BY RADICAL POLYMERISATION CONTROLLED BY REVERSIBLE ADDITION-FRAGMENTATION

This application is an application under 35 U.S.C. Section 371 of International Application Number PCT/FR2004/002690 filed on Oct. 21, 2004.

In the field of living or controlled polymerization, numerous polymer architectures can be obtained but the synthetic conditions are sometimes difficult to employ industrially. For example, the anionic polymerization process is highly sensitive to the presence of impurities, such as water. Also, the removal of the catalyst at the end of an atom transfer radical polymerization (ATRP) process makes it difficult to operate it industrially.

Reversible addition-fragmentation technologies controlled by thiocarbonylthio agents have thus represented an advance in the field of radical polymerization as they operate under a very broad range of conditions (solvents, monomers, process, and the like) and at a reasonable cost.

However, one disadvantage of these technologies is that, after polymerization, the thiocarbonylthio agent used to control the polymerization is still present in the polymer chains and is not chemically stable. In particular, it can decompose under the effect of chemical agents or of ultraviolet radiation and can produce odors or yellowing of the polymer, or can modify the properties of the polymer.

One of the aims of the present invention is to modify the thiocarbonylthio agent present in the polymer chains in order to render it chemically stable and thus to prevent it from decomposing under the effect of chemical agents or of ultraviolet radiation and producing odors or yellowing of the polymer, or modifying the properties of the polymer.

Previously, several approaches have been envisaged in order to chemically treat polymers comprising a thiocarbonylthio end.

Mention may be made, for example, of the use of primary or secondary amine, as is disclosed in the document Chiefari et al., Macromolecules, 1998, 31, 5559, and in the references cited in this document. Mention may also be made of the use of ammonia, as is disclosed in the document WO 03/070780.

However, these approaches exhibit the disadvantage of having to separate the reaction byproducts and excess reactants involved.

Patent application WO 02/090924 of the Applicant Company discloses the use in polymerization controlled by reversible addition-fragmentation of a xanthate controlled agent carrying an O-alkyl group obtained from a secondary alcohol by simple increase in temperature, the xanthate end at the chain end is converted to a thiol end. One of the disadvantages of such an approach is the high temperature at which this conversion takes place, generally well above 100° C.

Patent application WO 02/090397 of the Applicant Company discloses the radical reduction of the thiocarbonylthio end of a polymer in the presence of a system composed of a radical initiator, generally peroxide, and of a compound carrying a labile hydrogen atom, for example a secondary alcohol. The disadvantage of this approach is the need for high concentrations of hydrogen-donating compound, on the one hand, and, on the other hand, to have to manage the removal from the reaction medium of the sulfur byproducts resulting from the reaction.

Finally, when the polymers are in dispersion or in emulsion, conventional reactants do not diffuse or very partially or slowly diffuse into the particles or risk destabilizing the polymer dispersion or emulsion.

Another aim of the invention is to find a means of modifying the thiocarbonylthio agent present in the polymer chains in order to render it chemically stable, this means not modifying the structure of the polymer or its properties.

Another aim of the invention is to find a means of modifying the thiocarbonylthio agent present in the polymer chains in order to render it chemically stable, this means not requiring the use of stages of purification from the reactant used which has not been consumed.

Another aim of the invention is to find a means of modifying the thiocarbonylthio agent present in the polymer chains in order to render it chemically stable, it being possible for this means to be applied to a polymer whatever its form, that is to say in solution, in dispersion or in emulsion.

Another aim of the invention is to find a means of modifying the thiocarbonylthio agent present in the polymer chains in order to render it chemically stable, it being possible for this means to be applied to a broad range of chemical natures for polymers.

These aims and others are achieved by the present invention, a subject matter of which is thus a process for partially or completely oxidizing one or more thiocarbonylthio ends of at least one polymer resulting from a radical polymerization controlled by reversible addition-fragmentation using thiocarbonylthio agents which comprises a stage in which said polymer is brought into contact with an ozone-comprising gas, during which the ozone reacts with the thiocarbonylthio end or ends.

The thiocarbonylthio agents are attached via a chemical bond to an end of the chain of the polymer resulting from the radical polymerization by a process of reversible addition-fragmentation transfer type.

Mention may in particular be made, among the thiocarbonylthio agents used in the radical polymerization by a process of reversible addition-fragmentation transfer type, of dithioester agents of formula RS(C=S)R', as disclosed in patent applications WO 98/01478 and WO 99/35178, xanthates RS(C=S)OR', as disclosed in patent applications WO 98/58974, WO 00/75207 and WO 01/42312, dithiocarbamates of formula RS(C=S)NR$_1$R$_2$, such as those disclosed in patent applications WO 99/35177 and WO 99/31144, thioether-thione compounds, such as those disclosed in patent application FR 2 794 464, filed on behalf of Rhodia Chimie, or dithiocarbazate compounds, such as those disclosed in patent application WO 02/26836, filed on behalf of Symyx.

Thus, the thiocarbonylthio agents are compounds which can be of following formula (A), (B) or (C):

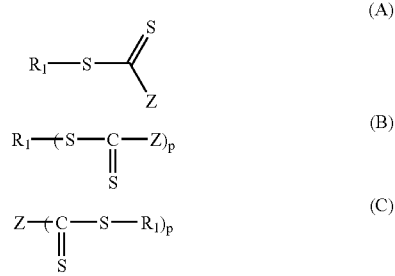

in which:
Z represents:
a hydrogen atom,
a chlorine atom,
an optionally substituted alkyl radical or an optionally substituted aryl radical,
an optionally substituted heterocycle,
an optionally substituted alkylthio radical, an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
a carboxyl or optionally substituted acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
$R_1$ represents:
   an optionally substituted alkyl, acyl, aryl, aralkyl, alkenyl or alkynyl group,
   an optionally substituted, aromatic, saturated or unsaturated, carbon ring or heterocycle,
   a polymer chain,
p represents a number between 2 and 10.

The $R_1$ or Z groups, when they are substituted, can be substituted by optionally substituted phenyl groups, optionally substituted aromatic groups, saturated or unsaturated carbon rings, saturated or unsaturated heterocycles, or the following groups: alkoxycarbonyl or aryloxycarbonyl (—COOR), carboxyl (—COOH), acyloxy (–O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—NR$_2$), halogen, perfluoroalkyl $C_nF_{2n+1}$, allyl, epoxy, alkoxy (—OR), S-alkyl, S-aryl, groups exhibiting a hydrophilic or ionic nature, such as alkaline salts of carboxylic acids or alkaline salts of sulfonic acids, poly(alkylene oxide) (PEO, PPO) chains, cationic substituents (quaternary ammonium salts), R representing an alkyl or aryl group, or a polymer chain.

According to a specific embodiment, $R_1$ is a substituted or unsubstituted, preferably substituted, alkyl group.

The compounds (A) of use in the present invention are, for example, the compounds in which $R_1$ is chosen from:
—CH$_2$C$_6$H$_5$
—CH(CH$_3$)(CO$_2$Et)
—CH(CH$_3$)(C$_6$H$_5$)
—CH(CO$_2$Et)$_2$
—C(CH$_3$)(CO$_2$Et)(S—C$_6$H$_5$)
—C(CH$_3$)$_2$(C$_6$H$_5$)
—C(CH$_3$)$_2$CN

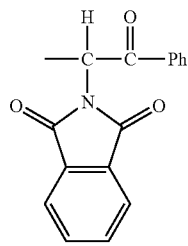

in which Et represents an ethyl group and Ph represents a phenyl group.

The optionally substituted alkyl, acyl, aryl, aralkyl or alkynyl groups generally exhibit 1 to 20 carbon atoms, preferably 1 to 12 carbon atoms and more preferably 1 to 9 carbon atoms.

They can be linear or branched. They can also be substituted by oxygen atoms, in the form in particular of esters, sulfur atoms or nitrogen atoms.

Mention may in particular be made, among alkyl radicals, of the methyl, ethyl, propyl, butyl, pentyl, isopropyl, tert-butyl, pentyl, hexyl, octyl, decyl or dodecyl radicals.

The alkynyl groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among aryl radicals, of the optionally substituted phenyl radical, in particular substituted by a nitro or hydroxyl functional group.

Mention may in particular be made, among aralkyl radicals, of the optionally substituted benzyl or phenethyl radical, in particular substituted by a nitro or hydroxyl functional group.

When $R_1$ or Z is a polymer chain, this polymer chain can result from a radical or ionic polymerization or can result from a polycondensation.

In the context of the present invention, preference is given, among the thiocarbonylthio agents, to xanthates (family where Z represents an optionally substituted alkoxy or aryloxy radical), dithiocarbamates (family where Z represents an optionally substituted amino radical), dithioesters (family where Z represents an optionally substituted alkyl or aryl radical), dithio-carbazates (family where Z represents an optionally substituted hydrazine radical) and trithiocarbonates. (family where Z represents an optionally substituted alkylthio or arylthio radical). Xanthates are the most preferred thiocarbonylthio compounds.

The polymer to which the thiocarbonylthio agent is attached on conclusion of the polymerization can be a homopolymer or a copolymer of ethylenically unsaturated monomer(s).

It is also possible, in the process of the invention, to treat a blend of several polymers with ozone.

The ethylenically unsaturated monomers used in the process of the present invention are all the monomers which polymerize in the presence of the thiocarbonylthio control agent to give active polymer chains.

These ethylenically unsaturated monomers are, for example, monoethylenically unsaturated monomers chosen from:
   styrene and styrene derivatives, such as α-methylstyrene or vinyltoluene,
   carboxylic acid vinyl esters, such as vinyl acetate, vinyl Versatate® or vinyl propionate,
   vinyl and vinylidene halides,
   unsaturated ethylenic mono- and dicarboxylic acids, such as acrylic acid, methacrylic acid, itaconic acid, maleic acid or fumaric acid, and the monoalkyl esters of the dicarboxylic acids of the type mentioned with alkanols preferably having 1 to 4 carbon atoms and their N-substituted derivatives,
   amides of unsaturated carboxylic acids, such as acrylamide, methacrylamide, N-methylolacrylamide, N-methylolmethacrylamide or N-alkylacrylamides,
   ethylenic monomers comprising a sulfonic acid group and its alkali metal or ammonium salts, for example vinylsulfonic acid, vinylbenzenesulfonic acid, α-acrylamidomethylpropanesulfonic acid or 2-sulfoethylene methacrylate,
   amides of vinylamine, in particular vinyl-formamide, vinylacetamide, N-vinylpyrrolidone and N-vinylcaprolactam, unsaturated ethylenic monomers comprising a secondary, tertiary or quaternary amino group or a heterocyclic group comprising nitrogen, such as, for example, vinylpyridines, vinylimidazole, aminoalkyl (meth)acrylates and aminoalkyl-(meth)acrylamides, such as dimethylaminoethyl acrylate, dimethylaminoethyl methacrylate, di(tert-butyl)aminoethyl acrylate, di(tert-butyl)-aminoethyl methacrylate, dimethylaminomethyl-acrylamide or dimethylaminomethylmethacrylamide, or zwitterionic monomers, such as, for example, sulfopropyl(dimethyl)aminopropyl acrylate, (meth)acrylic esters, such as glycidyl acrylate or glycidyl methacrylate, vinyl nitriles, monomers comprising at least one boronate functional group or one precursor, for example chosen from acryloylbenzeneboronic acid, methacryloylbenzeneboronic acid, 4-vinylbenzene-boronic acid, 3-acrylamidophenylboronic acid or 3-methacrylamidophenylboronic acid, alone or as mixtures, or in the form of salts, monomers comprising phosphonates, for example chosen from N-methacrylamidomethylphosphonic acid ester derivatives, in particular the n-propyl ester (RN 31857-11-1), the methyl ester (RN 31857-12-2), the ethyl ester (RN 31857-13-3), the n-butyl ester (RN 31857-14-4) or the isopropyl ester (RN 51239-00-0), and their phosphonic monoacid and diacid derivatives, such as N-methacrylamidomethylphosphonic diacid (RN 109421-20-7); N-methacrylamidoethylphosphonic acid ester derivatives, such as N-methacrylamidoethyl-phosphonic acid dimethyl ester (RN 266356-40-5) or N-methacrylamidoethylphosphonic acid di(2-butyl-3,3-dimethyl) ester (RN 266356-45-0), and their phosphonic monoacid and diacid derivatives, such as N-methacrylamidoethylphosphonic diacid (RN 80730-17-2); N-acrylamidomethylphosphonic acid ester derivatives, such as N-acrylamidomethyl-phosphonic acid dimethyl ester (RN 24610-95-5), N-acrylamidomethylphosphonic acid diethyl ester (RN 24610-96-6) or bis(2-chloropropyl) N-acryl-amidomethylphosphonate (RN 50283-36-8), and their phosphonic monoacid and diacid derivatives, such as N-acrylamidomethylphosphonic acid (RN 151752-38-4); the vinylbenzylphosphonate dialkyl ester derivatives, in particular the di(n-propyl) (RN 60181-26-2), di(isopropyl) (RN 159358-34-6), diethyl (RN 726-61-4), dimethyl (RN 266356-24-5), di(2-butyl-3,3-dimethyl) (RN 266356-29-0) and di(t-butyl) (RN 159358-33-5) ester derivatives, and their phosphonic monoacid and diacid alternative forms, such as vinylbenzylphosphonic diacid (RN 53459-43-1); diethyl 2-(4-vinylphenyl)-ethanephosphonate (RN 61737-88-0); dialkyl-phosphonoalkyl acrylate and methacrylate derivatives, such as 2-(acryloyloxy)ethylphosphonic acid dimethyl ester (RN 54731-78-1) and 2-(methacryloyloxy)ethylphosphonic acid dimethyl ester (RN 22432-83-3), 2-(methacryloyloxy)methylphosphonic acid diethyl ester (RN 60161-88-8), 2-(methacryloyloxy)methylphosphonic acid dimethyl ester (RN 63411-25-6), 2-(methacryloyloxy)propylphosphonic acid dimethyl ester (RN 252210-28-9), 2-(acryloyloxy)methylphosphonic acid diisopropyl ester (RN 51238-98-3) or 2-(acryloyloxy)ethyl-phosphonic acid diethyl ester (RN 20903-86-0), and their phosphonic monoacid and diacid alternative forms, such as 2-(methacryloyloxy)ethylphosphonic acid (RN 80730-17-2), 2-(methacryloyloxy)methyl-phosphonic acid (RN 87243-97-8), 2-(meth-acryloyloxy)propylphosphonic acid (RN 252210-30-3), 2-(acryloyloxy) propylphosphonic acid (RN 254103-47-4) and 2-(acryloyloxy)ethylphosphonic acid; vinylphosphonic acid, optionally substituted by cyano, phenyl, ester or acetate groups, vinylidenephosphonic acid, in the sodium salt form or the form of its isopropyl ester, or bis(2-chloroethyl)vinylphosphonate, it being possible for these monomers comprising a phosphonic mono- or diacid functional group to be used in the partially or completely neutralized form, optionally neutralized by an amine, for example dicyclohexylamine, monomers chosen from the phosphate analogs of the phosphonate-comprising monomers described above, the monomers then comprising a —C—O—P— sequence in comparison with the —C—P— sequence of the phosphonates, and monomers carrying an alkoxysilane group chosen from trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilyl-propyl methacrylate, diisopropoxysilylpropyl methacrylate, trimethoxysilylpropyl methacrylate, triethoxysilylpropyl methacrylate, tributoxy-silylpropyl methacrylate, trimethoxysilylpropyl acrylate, triethoxysilylpropyl acrylate, tributoxysilylpropyl acrylate, dimethoxymethyl-silylpropyl acrylate, diethoxymethylsilylpropyl acrylate, dibutoxymethylsilylpropyl acrylate, diisopropoxymethylsilylpropyl acrylate, dimethoxy-silylpropyl acrylate, diethoxysilylpropyl acrylate, dibutoxysilylpropyl acrylate, diiso-propoxysilylpropyl acrylate, trimethoxysilylpropyl acrylate, triethoxysilylpropyl acrylate or tributoxysilylpropyl acrylate.

The term "(meth)acrylic esters" denotes the esters of acrylic acid and of methacrylic acid with hydrogenated or fluorinated $C_1$-$C_{12}$ alcohols, preferably $C_1$-$C_8$ alcohols. Mention may be made, among the compounds of this type, of: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate or isobutyl methacrylate.

The vinyl nitriles include more particularly those having from 3 to 12 carbon atoms, such as, in particular, acrylonitrile and methacrylonitrile.

Use is preferably made, for the preparation of polyvinylamine blocks, as ethylenically unsaturated monomers, of amides of vinylamine, for example vinylformamide or vinylacetamide. The polymer obtained is then hydrolyzed at acidic or basic pH.

Use is preferably made, for the preparation of poly(vinyl alcohol) blocks, as ethylenically unsaturated monomers, of carboxylic acid vinyl esters, such as, for example, vinyl acetate. The polymer obtained is then hydrolyzed at acidic or basic pH.

The ethylenically unsaturated monomers used are preferably chosen from styrene monomers, vinyl esters, neutral or charged hydrophilic acrylates, hydrophobic acrylates, neutral or charged hydrophilic methacrylates, hydrophobic methacrylates, hydrophilic or hydrophobic and neutral or charged acrylamido derivatives or hydrophilic or hydrophobic and neutral or charged methacrylamido derivatives.

The types and amounts of polymerizable monomers employed according the present invention vary according to the specific final application for which the polymer is intended. These variations are well known and can be easily determined by a person skilled in the art.

These ethylenically unsaturated monomers can be used alone or as mixtures.

The polymer according to the invention can also result from a reversible addition-fragmentation polymerization in which use was additionally made of polyethylenically unsaturated monomers which were subsequently subjected to a crosslinking stage in order to obtain first-generation or higher-generation microgel polymers, as is disclosed, for example, in the document FR 02/09987 of the Applicant Company, star polymers, as is disclosed in the document WO 98/31739 of DuPont, comb polymers or hyperbranched polymers.

The polyethylenically unsaturated monomers of use are chosen from organic compounds comprising at least two ethylenic unsaturations and at most 10 ethylenic unsaturations and which are known as being reactive by the radical route.

Preferably, these monomers exhibit two or three ethylenic unsaturations.

Thus, mention may in particular be made of acrylic, methacrylic, acrylamido, methacrylamido, vinyl ester, vinyl ether, diene, styrene, α-methylstyrene and allyl derivatives. These monomers can also include functional groups other than ethylenic unsaturations, for example hydroxyl, carboxyl, ester, amide, amino, substituted amino, mercapto, silane, epoxy or halo functional groups.

The monomers belonging to these families are divinylbenzene and divinylbenzene derivatives, vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate or trimethylolpropane trimethacrylate. For the family of the polyfunctional acrylates, mention may in particular be made of vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane tetraacrylate or dipentaerythritol pentaacrylate. As regards the vinyl ethers, mention may in particular be made of vinyl crotonate, diethylene glycol divinyl ether, 1,4-butanediol divinyl ether or triethylene glycol divinyl ether. For the allyl derivatives, mention may in particular be made of diallyl phthalate, diallyldimethylammonium chloride, diallyl maleate, sodium diallyloxyacetate, diallylphenylphosphine, diallyl pyrocarbonate, diallyl succinate, N,N'-diallyl-tartardiamide, N,N-diallyl-2,2,2-trifluoroacetamide, the allyl ester of diallyloxyacetic acid, 1,3-diallylurea, triallylamine, triallyl trimesate, triallyl cyanurate, triallyl trimellitate or 1,3,5-triallyltriazine-2,4,6(1H,3H,5H)-trione. For the acryl-amido derivatives, mention may in particular be made of N,N'-methylenebisacrylamide, N,N'-methylenebis-methacrylamide, glyoxalbisacrylamide or diacryl-amidoacetic acid. As regards the styrene derivatives, mention may in particular be made of divinylbenzene and 1,3-diisopropylbenzene. In the case of the diene monomers, mention may in particular be made of butadiene, chloroprene and isoprene.

Preference is given, as polyethylenically unsaturated monomers, to N,N'-methylenebisacrylamide, divinyl-benzene, ethylene glycol diacrylate or trimethylolpropane triacrylate.

These polyethylenically unsaturated monomers can be used alone or as mixtures.

The molar fraction of polyethylenically unsaturated monomers with respect to the monoethylenically unsaturated monomers can be between 0.001 and 1.

However, it is preferable for a person skilled in the art to adapt the types and amounts of polyethylenically unsaturated monomers used in the polymerization in order to avoid the presence of ethylenic unsaturations in the polymer to which the treatment with ozone is applied.

This is because there would be a risk of the ethylenic unsaturations reacting with the ozone.

The treatment with ozone of the invention can be applied to all the possible architectures of polymers. Mention may in particular be made of diblock polymers, triblock polymers, star polymers, microgel polymers, gradient polymers, random polymers, hyperbranched polymers or comb polymers.

The thiocarbonylthio agents react with the ozone via a reaction which will be referred to as oxidation without, however, being restricted to a specific chemistry or favoring a given mechanism. In particular, this reaction can be pushed forward to a greater or lesser extent according to the conditions for bringing into contact with the ozone-comprising gas and can thus result in different byproducts.

The process of the invention comprises bringing a polymer and a gas into contact.

This can be carried out using any type of device conventionally used for bringing a gas and a liquid into contact. Mention may be made, as examples, of the devices mentioned in the document by C. Moizard, G. Wild and J. C. Charpentier, "Absorption avec reaction chimique", Techniques de l'ingénieur, Traité Génie des procédés ["Absorption with Chemical Reaction", Techniques for the Engineer, Process Engineering Treatise], volume 1, page 79, 1997. These devices can operate continuously or semicontinuously or batchwise. The device can, for example, be a stirred reactor equipped with a device for dispersing gas at the vessel bottom (for example, a sintered glass) or else a cocurrent or, preferably, countercurrent gas/liquid column, with or without packing, or any other conventional method.

The carrier gas for the ozone can be air, helium, oxygen, argon, carbon dioxide, nitrogen or a mixture of these gases. Air and oxygen are preferred. The ozone which this gas comprises can be generated by passing air or oxygen into an ozone-generating unit (ozonizer), in which the production of ozone is due to the oxidation of oxygen under the effect of an electric spark or corona by a process well known to experts in the generation of ozone, such as described in the document by C. Nebel, Kirk-Othmer Encyclopedia of Chemical Technology, London, Interscience Publisher, Volume 16, pages 683-713, 1981.

Ozonizers which produce ozone at a level of typically 2% by weight in the air and typically 8% by weight in oxygen are encountered commercially. Mention may be made, by way of example, of the BMT 803 ozone generator sold by BMT Messtechnik GmbH.

The carrier gas can comprise from approximately 0.01% by weight to approximately 8% by weight of ozone, with respect to the total weight of gases. This amount is not critical insofar as even a small amount of ozone will react with the thiocarbonylthio. The operation in which the gas and liquid are brought into contact should be continued for a longer period of time if the gas comprises less ozone. There may in some cases be disadvantages to this, for example the generation of foams if the polymer comprises a surfactant. In this case, it will be preferable to operate with a carrier gas richer in ozone.

The molar ratio of the ozone to the thiocarbonylthio is between approximately 10 000:1 and approximately 1:100, preferably between approximately 1000:1 and 1:10 and more preferably still between approximately 100:1 and 1:1.

The temperature and pressure conditions during the ozonolysis reaction can vary and will depend on the method chosen for bringing the gas and the liquid into contact. It is possible to operate at a pressure of less than 1 bar. The increase in pressure in the reactor can promote the diffusion of the ozone into the liquid and make it possible to accelerate the reaction and it is thus possible to choose to operate at a pressure greater than atmospheric pressure if it is desired for the reaction to take place more rapidly. For this, it is necessary to compress the ozone-comprising gas after generation of the ozone and to have available a suitable device. It is possible to operate between atmospheric pressure and 10 bar absolute and preferably between atmospheric pressure and 2 bar absolute.

The temperature can also be a factor in accelerating the reaction by promoting the diffusion of the ozone into the liquid, in particular when this liquid is a suspension or dispersion. It is possible to operate between $-10°$ C. and $110°$ C. and preferably between $15°$ C. and $80°$ C. and more preferably still between $30°$ C. and $80°$ C., taking into account, obviously, the melting point and the boiling point of the solvent.

Before contact with the ozone-comprising gas, the polymer comprises from 0.01% to 35% by weight of thiocarbonylthio. After contact with the ozone-comprising gas, the polymer comprises from approximately 80% to 0% by weight of thiocarbonylthio, with respect to the initial weight of thiocarbonylthio. This is because, in some cases, there may be no need to chemically react all the initial thiocarbonylthio but only a portion, for example in order to limit the smell or the color which might be brought about by its chemical change below a threshold acceptable to the client.

This method can be used with any liquid formulation comprising a polymer, whether this polymer is in solution in an aqueous or organic solvent, in dispersion in water or a solvent or a mixture of solvents, or in aqueous emulsion (latex).

If the polymer is in dispersion, the particle size of the dispersion can be between 10 and 50 000 nanometers. If the polymer is in emulsion of particle size of the dispersion is between 10 and 500 nanometers.

Analytical Method

It can be confirmed that the thiocarbonylthio has indeed reacted with the ozone in one of the following ways:

1) By GPC (gel permeation chromatography)-THF (with double detection: refractometric and UV)

At the outlet of the GPC column, the polymer molecules exit in order of decreasing size (that is to say, often of decreasing weight); they subsequently pass in front of a first refractometric detector (RI). The area of the corresponding peak is proportional to the amount of polymer (of this size) injected into the column. The molecules then pass in front of a UV detector (given wavelength); the area of corresponding peak is proportional to the amount of polymer of this size absorbing at the set wavelength.

In practice, the UV detector is adjusted to a wavelength where the thiocarbonylthio functional group selectively absorbs with respect to the backbone of the polymer chain. Thus, at the wavelength chosen, only the thiocarbonylthio end absorbs in UV radiation and not the polymer chain.

For example, the UV detector is adjusted to a wavelength of 290 nm in the case of the thiocarbonylthio compounds described in the examples of this invention.

On the chromatogram resulting from refractometric detection (detection by weight), a peak exits at the retention time corresponding to the polymer. On the chromatogram of the UV detector, there is also a peak at this retention time and its area is proportional to the molar amount of polymer carrying one or more thiocarbonylthio functional groups. As this molar amount depends on the amount of polymer injected, a correction has to be carried out if it is desired to compare the chromatogram with that of a reference sample (the area detected using the UV detector has to be multiplied by the ratio of the RI area of the reference to the RI area of the sample to be compared).

2) When the polymer comprises, before contact with the ozone-comprising gas, an amount of thiocarbonylthio which is too low to be detected by the method described in part 1 above, it is possible to confirm that coloration or smell or modification in the properties of the polymer which are due to the chemical change of the thiocarbonylthio do not appear with use.

The use of ozone exhibits the following advantages:

It can be used whatever the form under which the polymer exists, whether the polymer is in solution, dispersion or emulsion.

It can be used for a very broad range of chemical natures of polymers. The only constraint is that the polymer should not comprise functional groups, other than the thiocarbonylthio agents, capable of reacting with ozone.

The advantage of using ozone is that the oxidation of the thiocarbonylthio can take place without, however, generating byproducts which are difficult to remove from the reaction medium.

Another subject matter of the invention is a polymer capable of being obtained by the process as described above.

Another subject matter of the invention is the use of this polymer in the applications in which polymers are used.

Other aspects and advantages of the processes or of the products which are subject matters of the invention will become apparent in the light of the examples which are presented below by way of illustration and without any limitation.

EXAMPLE 1

Treatment with Ozone of a Solution of poly(butyl acrylate) Synthesized in the Presence of O-ethyl S-(1-(methoxycarbonyl)ethyl) xanthate 1st Stage: Synthesis of poly(butyl acrylate) in the Presence of O-ethyl S-(1-(methoxycarbonyl)ethyl) xanthate 164 g of ethanol and 23.81 g of O-ethyl S-(1-(methoxycarbonyl)ethyl) xanthate $(CH_3CHCO_2CH_3)$ $S(C=S)$ OEt are introduced into a 0.5 l glass reactor equipped with a jacket and with an anchor stirrer. The reactor is rendered inert with argon for 15 minutes and then the temperature is increased up to $70°$ C. 2.81 g of azobis-isobutyronitrile (AIBN) are then added all at once, at the same time as the introduction of 80 g of butyl acrylate is begun. All the monomer is introduced continuously over one hour. At this point, 2.81 g of AIBN are added. The reaction medium is maintained at this temperature for an additional two hours before being cooled to ambient temperature.

A sample is withdrawn and analyzed by steric exclusion chromatography (SEC). The number-average molar mass (Mn) is measured by elution of the polymer in THF with calibration by polystyrene. Mn=900 g/mol. The analysis of the sample by gas chromatography (GC) allows it to be concluded that the fraction of monomer polymerized is 75%.

The reaction medium is subsequently dried by evaporating the solvent and the unconverted monomer under vacuum.

2nd Stage: Treatment with Ozone of the Polymer Resulting from the First Stage 123.9 g of poly(butyl acrylate) resulting from stage 1 are dissolved in ethanol so that the solution comprises 17.8% by weight of polymer. The temperature of the solution is maintained at 38° C. A stream of ozone is bubbled into the polymer solution with an ozone throughput of 4 to 5 grams per hour.

Using the analytical method based on the monitoring of the decrease in the area under the GPC chromatogram, in UV detection at 290 nm, as a function of the time, it has been found that 97% of the thiocarbonylthio end of the polymer is chemically modified after bubbling for 1 h 30 and more than 99% in 2 hours.

This result is reinforced by an NMR analysis of the polymer before and after treatment with ozone. This is because the ozone brings about the disappearance of the peak characteristic of the C=S double bond of the thiocarbonylthio end situated at 210 ppm ($^{13}$C NMR).

What is claimed is:

1. A process for partially or completely oxidizing one or more thiocarbonylthio ends of a polymer resulting from a radical polymerization controlled by reversible addition-fragmentation using thiocarbonylthio comprising the step of bringing said polymer into contact with an ozone-comprising gas, and reacting the ozone with the thiocarbonylthio end or ends.

2. The process as claimed in claim 1, wherein the ozone-comprising gas is air, helium, oxygen, argon, carbon dioxide, nitrogen or a mixture thereof.

3. The process as claimed in claim 1, wherein the ozone-comprising gas comprises from about 0.01% by weight to about 8% by weight of ozone, with respect to the total weight of gases.

4. The process as claimed in claim 1, wherein the ozone has a molar ratio to the thiocarbonylthio of between about 10 000:1 and about 1:100.

5. The process as claimed in claim 1, wherein the thiocarbonylthio compound is a compound of following formula (A), (B) or (C):

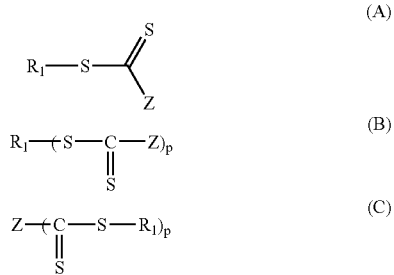

wherein:
Z represents:
a hydrogen atom,
a chlorine atom,
an optionally substituted alkyl radical or an optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
a carboxyl or optionally substituted acyloxy radical,
an optionally substituted aroyloxy radical,
an optionally substituted carbamoyl radical,
a cyano radical,
a dialkyl- or diaryl-phosphonato radical,
a dialkyl-phosphinato or diaryl-phosphinato radical, or
a polymer chain,
  $R_1$ represents:
an optionally substituted alkyl, acyl, aryl, aralkyl, alkenyl or alkynyl group,
an optionally substituted, aromatic, saturated or unsaturated, carbon ring or heterocycle, or
a polymer chain, and
  p represents a number between 2 and 10.

6. The process as claimed in claim 5, wherein the thiocarbonylthio compounds are xanthate, dithiocarbamate, dithioester, dithiocarbazate or trithiocarbonate compounds.

7. The process as claimed in claim 1, wherein the polymer comprises from about 0.01% to about 35% by weight of thiocarbonylthio before contact with the ozone-comprising gas.

8. The process as claimed in claim 1, wherein the polymer comprises from about 80% to 0% by weight of thiocarbonylthio with respect to the initial weight of thiocarbonylthio after contact with the ozone-comprising gas.

9. The process as claimed in claim 1, wherein the polymer is a homopolymer or a copolymer of ethylenically unsaturated monomer(s).

10. The process as claimed in claim 9, wherein the ethylenically unsaturated monomers are monoethylenically unsaturated monomers selected from styrene, α-methylstyrene, vinyltoluene, vinyl acetate, vinyl neodecanoate, vinyl propionate, vinyl halide, vinylidene halide, acrylic acid, methacrylic acid, itaconic acid, maleic acid, fumaric acid, acrylamide, methacrylamide, N-methylolacrylamide, N-methylolmethacrylamide or N-alkylacrylamides, vinylsulfonic acid, vinylbenzenesulfonic acid, α-acrylamidomethylpropanesulfonic acid, 2-sulfoethylene methacrylate, vinylformamide, vinylacetamide, N-vinylpyrrolidone, N-vinylcaprolactam, vinylpyridines, vinylimidazole, dimethylaminoethyl acrylate, dimethylaminoethyl methacrylate, di(tert-butyl)aminoethyl acrylate, di(tert-butyl)aminoethyl methacrylate, dimethylaminomethylacrylamide, dimethylaminomethylmethacrylamide, sulfopropyl(dimethyl)aminopropyl acrylate,
glycidyl acrylate, glycidyl methacrylate, acryloylbenzeneboronic acid, methacryloylbenzeneboronic acid, 4-vinylbenzeneboronic acid, 3-acrylamidophenylboronic acid, 3-methacrylamidophenylboronic acid,
N-methacrylamidomethylphosphonic diacid; N-methacrylamidoethylphosphonic acid dimethyl ester, N-methacrylamidoethylphosphonic acid di(2-butyl-3, 3-dimethyl) ester, N-methacrylamidoethylphosphonic diacid; N-acrylamidomethylphosphonic acid dimethyl ester, N-acrylamidomethylphosphonic acid diethyl ester, bis(2-chloropropyl) N-acryl-amidomethyphosphonate, N-acrylamidomethylphosphonic acid, vinylbenzylphosphonic diacid, diethyl 2-(4-vinylphenyl)

ethanephosphonate, 2-(acryloyloxy)ethylphosphonic acid dimethyl ester, 2-(methacryloyloxy)ethylphosphonic acid dimethyl ester, 2-(methacryloyloxy)methylphosphonic acid diethyl ester, 2-(methacryloyloxy)methylphosphonic acid dimethyl ester, 2-(methacryloyloxy)propylphosphonic acid dimethyl ester, 2-(acryloyloxy)methylphosphonic acid diisopropyl ester, 2-(acryloyloxy)ethylphosphonic acid diethyl ester, 2-(methacryloyloxy)ethylphosphonic acid, 2-(methacryloyloxy)methylphosphonic acid, 2-(methacryloyloxy)propylphosphonic acid, 2-(acryloyloxy) propylphosphonic acid, 2-(acryloyloxy)ethylphosphonic acid, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl methacrylate, triethoxysilylpropyl methacrylate, tributoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, trimethoxysilylpropyl acrylate, triethoxysilylpropyl acrylate or tributoxysilylpropyl acrylate.

11. The process as claimed in claim 9, wherein the ethylenically unsaturated monomers are styrene monomers, vinyl esters, neutral or charged hydrophilic acrylates, hydrophobic acrylates, neutral or charged hydrophilic methacrylates, hydrophobic methacrylates, hydrophilic or hydrophobic and neutral or charged acrylamido derivatives, hydrophilic or hydrophobic and neutral or charged methacrylamido derivatives, or their mixtures.

12. The process as claimed in claim 9, wherein a fraction of the ethylenically unsaturated monomers are polyethylenically unsaturated monomers.

13. The process as claimed in claim 12, wherein the polyethylenically unsaturated monomer comprises at least two ethylenic unsaturations and at most 10 ethylenic unsaturations.

14. The process as claimed in claim 12, wherein the polyethylenically unsaturated monomer is an acrylic, methacrylic, acrylamido, methacrylamido, vinyl ester, vinyl ether, diene, styrene, α-methylstyrene or allyl derivatives.

15. The process as claimed in claim 12, wherein the polyethylenically unsaturated monomer additionally presents one or more functional groups other than ethylenic unsaturations selected from the group consisting of the hydroxyl, carboxyl, ester, amide, amino, substituted amino, mercapto, silane, epoxy and halo functional groups.

16. The process as claimed in claim 12, wherein the polyethylenically unsaturated monomer is vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate or trimethylolpropane trimethacrylate; vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane tetraacrylate or dipentaerythritol pentaacrylate; vinyl crotonate, diethylene glycol divinyl ether, 1,4-butanediol divinyl ether or triethylene glycol divinyl ether; diallyl phthalate, diallyldimethylammonium chloride, diallyl maleate, sodium diallyloxyacetate, diallylphenylphosphine, diallyl pyrocarbonate, diallyl succinate, N,N'-diallyl-tartardiamide, N,N-diallyl-2,2,2-trifluoroacetamide, the allyl ester of diallyloxyacetic acid, 1,3-diallylurea, triallylamine, triallyl trimesate, triallyl cyanurate, triallyl trimellitate or 1,3,5triallyltriazine-2,4,6(1H,3H,5H)-trione; N,N'-methylenebisacrylamide, N,N'-methylenebismethacrylamide, glyoxalbisacrylamide or diacrylamidoacetic acid; divinylbenzene and 1,3-diisopropenylbenzene; butadiene, chloroprene or isoprene.

17. The process as claimed in claim 12, wherein the polyethylenically unsaturated monomer is N,N'-methylenebisacrylamide, divinylbenzene, ethylene glycol diacrylate or trimethylolpropane triacrylate.

18. The process as claimed in claim 9, wherein the ethylenically unsaturated monomers comprise polyethylenically unsaturated monomers and monoethylenically unsaturated monomers, and further wherein the polyethylenically unsaturated monomers present a molar fraction with respect to the monoethylenically unsaturated monomers of between 0.001 and 1.

19. The process as claimed in claim 1, wherein the polymer is in solution in an aqueous or organic solvent, in dispersion in water or a solvent or in an aqueous emulsion (latex).

20. The process as claimed in claim 19, wherein the particle size of the dispersion is between about 10 and about 50 000 nanometers, and the particle size of the aqueous emulsion is between about 10 and about 500 nanometers.

21. The process as claimed in claim 1, wherein the polymer is brought into contact with the ozone countercurrentwise.

22. The process as claimed in claim 4, wherein the ozone has a molar ratio to the thiocarbonylthio of between about 100:1 and about 1:1.

* * * * *